Patented Sept. 20, 1949

2,482,450

UNITED STATES PATENT OFFICE 2,482,450

BARIUM HALOPHOSPHATE PHOSPHOR

Robert Stirling Wells, Rugby, England, assignor to General Electric Company, a corporation of New York No Drawing. Application January 10, 1947, Serial No. 721,449. In Great Britain May 23, 1945

5 Claims. (Cl. 252—301.4)

This invention relates to compounds, generally known as phosphors, capable of becoming luminescent under the action both of the ultra-violet radiation produced by the low pressure mercury vapor lamp, and of the long wave ultra-violet radiations produced by the high pressure mercury vapor lamp, and also under the action of cathode rays. This application is a continuation-in-part of my application Serial No. 639,423, filed January 5, 1946, and now abandoned.

The invention comprises a luminescent compound consisting of the fluoro-, the chloro-, or the fluoro-chloro-phosphate of barium with uranium as an activator.

In other words, the phosphor consists of a barium halophosphate wherein the halide component is the fluoride or chloride or fluoro-chloride of barium.

In preparing uranium activated barium chlorophosphate for use as a luminescent material, barium phosphate and barium chloride are employed as the starting materials.

The barium phosphate may be prepared by precipitation from a solution of $BaCl_2$ by $(NH_4)_2HPO_4$ in the presence of sufficient $NH_4OH$ to make the liquid slightly alkaline. These chemicals are to be of A. R. standard of purity. Approximately equivalent proportions of the two reactants are employed, and the resulting precipitate is thoroughly washed with distilled water, and then dried. The precipitate is believed to consist largely of $Ba_3(PO_4)_2$ with a small proportion of $BaNH_4PO_4$. The purity of this compound is such as to be suitable for the manufacture of luminescent compounds.

Barium phosphate, prepared as above described, is mixed with pure barium chloride (A. R. standard) in the ratio of 3 mols. of barium phosphate to from ½ to 2 mols. of barium chloride, and between 1 and 20 per cent by weight, of uranium oxide, reckoned on the combined weights of the barium phosphate and barium chloride. The ingredients may be intimately mixed with a small amount of distilled water to form a stiff paste. This paste is then dried and ground or milled to a fine powder and heated at a temperature of between 900 and 1000° C. for a period which may be of the order of ½ to 1 hour, according to the quantity employed. The resulting product is then ground and is preferably reheated one or more times, with grinding between each heating operation, to prevent undue sintering of the mass until optimum brightness is obtained. During this heating, reaction between the ingredients takes place with the formation of the activated barium chloro-phosphate. The powder is then ready for use.

An electrically heated furnace to which limited access of atmospheric air is allowed, may be employed for the heating of the mixture. The final grinding is preferably such as to reduce the mixture to a powder capable of passing through a 200 mesh screen, although its average particle size is smaller than this.

Although the limit of from ½ to 2 mols. of barium chloride has been specified above, we prefer an amount of barium chloride in the ratio of 1 mol. barium chloride to 3 mols. of barium phosphate.

The quantity of uranium oxide is not critical, but 6–7 per cent, by weight, is preferred. If desired, the uranium oxide may be replaced by such a quantity of another uranium or uranyl salt as to supply, during the firing process, an amount of uranium equivalent to that given by the specified amount of uranium oxide.

The actual barium phosphate used has some effect on the fluorescence, but it is undesirable to use a phosphate more basic than $Ba_3(PO_4)_2$.

If it is required to obtain the fluoro-phosphate of barium, the barium chloride is replaced by an equivalent molecular proportion of barium fluoride.

The barium fluoride may be prepared by precipitation from a solution of barium nitrate—$Ba(NO_3)_2$—and a solution of potassium fluoride, approximately equivalent amounts of the reactants being employed.

Similarly, when the fluoro-chloro-phosphate of barium is desired, any part of the barium chloride is replaced by an equivalent molecular proportion of the fluoride.

The new compounds may be utilized in any of the ways in which such luminescent compounds have hitherto been employed, e. g., as coatings on the envelopes of low pressure discharge lamps, as screen material for cathode ray tubes, or as a paint for advertising and decorative purposes.

What I claim as new and desire to secure by Letters Patent of the United States is:

1. A barium halophosphate phosphor, consisting of the fired reaction product of about 3 mols of barium phosphate, about ½–2 mols of a barium halide selected from the group consisting of the fluoride, chloride and fluorochloride of barium and uranium activator in an amount of 1–20 per cent, by weight, of uranium oxide based on the combined weights of the barium phosphate and barium halide.

2. A barium halophosphate phosphor, consisting of the fired reaction product of about 3 mols of barium phosphate, about 1 mol of a barium halide selected from the group consisting of the fluoride, chloride and fluorochloride of barium and uranium activator in an amount between 1–20%, by weight, of uranium oxide based on the combined weights of the barium phosphate and barium halide.

3. A barium fluorophosphate phosphor, consisting of the fired reaction product of about 3 mols of barium phosphate, about ½–2 mols of barium fluoride, and uranium activator in an amount between 1–20 per cent, by weight, of uranium oxide based on the combined weights of the barium phosphate and barium fluoride.

4. A barium chlorophosphate phosphor, consisting of the fired reaction product of about 3 mols of barium phosphate, about ½–2 mols of barium chloride, and uranium activator in an amount between 1–20 per cent, by weight, of uranium oxide based on the combined weights of the barium phosphate and barium chloride.

5. A barium fluorochlorophosphate, consisting of the fired reaction product of about 3 mols of barium phosphate, about ½–2 mols of barium fluoride and chloride combined, and uranium activator in an amount between 1–20 per cent, by weight, of uranium oxide based on the combined weights of the barium phosphate and the barium fluoride and chloride.

ROBERT STIRLING WELLS.

REFERENCES CITED

The following references are of record in the file of this patent:

UNITED STATES PATENTS

| Number | Name | Date |
|---|---|---|
| 2,323,284 | Toorks | June 29, 1943 |

OTHER REFERENCES

Mellor, "Inorganic and Theoretical Chemistry," vol. III, pages 901 and 902.

De Ment, "Fluorochemistry" (1945), pages 479 and 481.